United States Patent [19]
Peterson

[11] Patent Number: 5,519,818
[45] Date of Patent: May 21, 1996

[54] OBJECT-ORIENTED GRAPHIC PICKING SYSTEM

[75] Inventor: John W. Peterson, Menlo Park, Calif.

[73] Assignee: Taligent, Inc., Cupertino, Calif.

[21] Appl. No.: 308,888

[22] Filed: Sep. 19, 1994

[51] Int. Cl.⁶ .................................................. G06T 11/00
[52] U.S. Cl. .......................... 395/133; 395/155; 395/161
[58] Field of Search .................................. 395/133–135, 395/142, 145, 147, 152–154, 155–161; 382/309–311

[56] References Cited

U.S. PATENT DOCUMENTS

| | | | |
|---|---|---|---|
| 4,821,220 | 4/1989 | Duisberg | 264/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1992 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,237,647 | 8/1993 | Roberts et al. | 395/133 X |
| 5,313,636 | 5/1994 | Noble et al. | 395/700 |
| 5,315,703 | 5/1994 | Matheny et al. | 395/164 |
| 5,315,709 | 5/1994 | Alston, Jr. et al. | 395/600 |
| 5,317,741 | 5/1994 | Schwanke | 395/700 |
| 5,321,841 | 6/1994 | East et al. | 395/725 |
| 5,325,481 | 6/1994 | Hunt | 395/159 |
| 5,325,522 | 6/1994 | Vaughn | 395/600 |
| 5,325,524 | 6/1994 | Black | 395/600 |
| 5,325,533 | 6/1994 | McInerney et al. | 395/700 |
| 5,371,845 | 12/1994 | Newell et al. | 395/133 X |

*Primary Examiner*—Almis R. Jankus
*Attorney, Agent, or Firm*—Keith Stephens

[57] ABSTRACT

A method and apparatus for defining customizable pick, hit or find detection criteria for geometric types including curves and using the results of the search as a basis for determining whether to perform an action. According to the inventive method, a search protocol is defined for geometric types. The search criteria is compared with graphic objects to determine whether the object matches the criteria. Based on the results of the comparison, an output is produced. In addition to allowing customized hit criteria for primitive geometric types, the hit object framework allows hit criteria to be specified for geometric types created by the application developer.

16 Claims, 19 Drawing Sheets

| TPolygon | TCurve | TLoop | TPolyline | TEllipse |

MGRAPHIC REPRESENTATION

---

GEOMETRY

| TGPolygon | TGCurve | TGLoop | TGPolyline | TGEllipse |

THOUSE   TARROW   TGRAPHICFOLDER

Convex hulls of various spans of the curve

OBJECT-ORIENTED GRAPHIC PICKING SYSTEM

BACKGROUND OF THE INVENTION

The present invention generally relates to a mechanism for "hit" detection and, more particularly, to a hit detection mechanism in an object oriented programming (OOP) environment. The subject invention is a framework system which allows a programmer or applications developer to customize the search criteria for graphic objects so that an application can identify objects on which to perform a specified action. The invention is disclosed in terms of a preferred embodiment which uses a popular object oriented programming language, C++, but the principles are applicable to other computer programming languages both object oriented and procedural.

DESCRIPTION OF THE PRIOR ART

Object oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C ++ programs. The most widely used object based and object oriented programming languages trace their heritage to Simula developed in the 1960s by O. J. Dahl, B. Myhrhaug and K. Nygrad of Norway. Further information on the subject of OOP may be had by reference to *Object Oriented Design with Applications* by Grady Booch, the Benjamin/Cummings Publishing Co., Inc., Redwood City, Calif. (1991).

There has been a long felt need in the art for a developer of an application to be able to identify geometric objects, to define customized search criteria for each geometric object and to specify the performance of an action based on the results of the search. To date, no system has been developed which addresses this need.

SUMMARY OF THE INVENTION

It is therefore an object of the present invention to provide an object-oriented framework for defining hit criteria for geometric types. The criteria can be customized by the application developer and can specify the requirements for a hit (pick) or a find, the extent of the search to be performed and the action to take when a hit (pick) or find is successful.

According to the invention, there is provided a system for defining hit or find criteria for geometric types. The system uses this criteria to directly manipulate graphic objects which conform to the geometric type. The developer of an application can also specify a specific hit criteria for two dimensional (2D) and three dimensional (3D) graphic objects which they have created.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
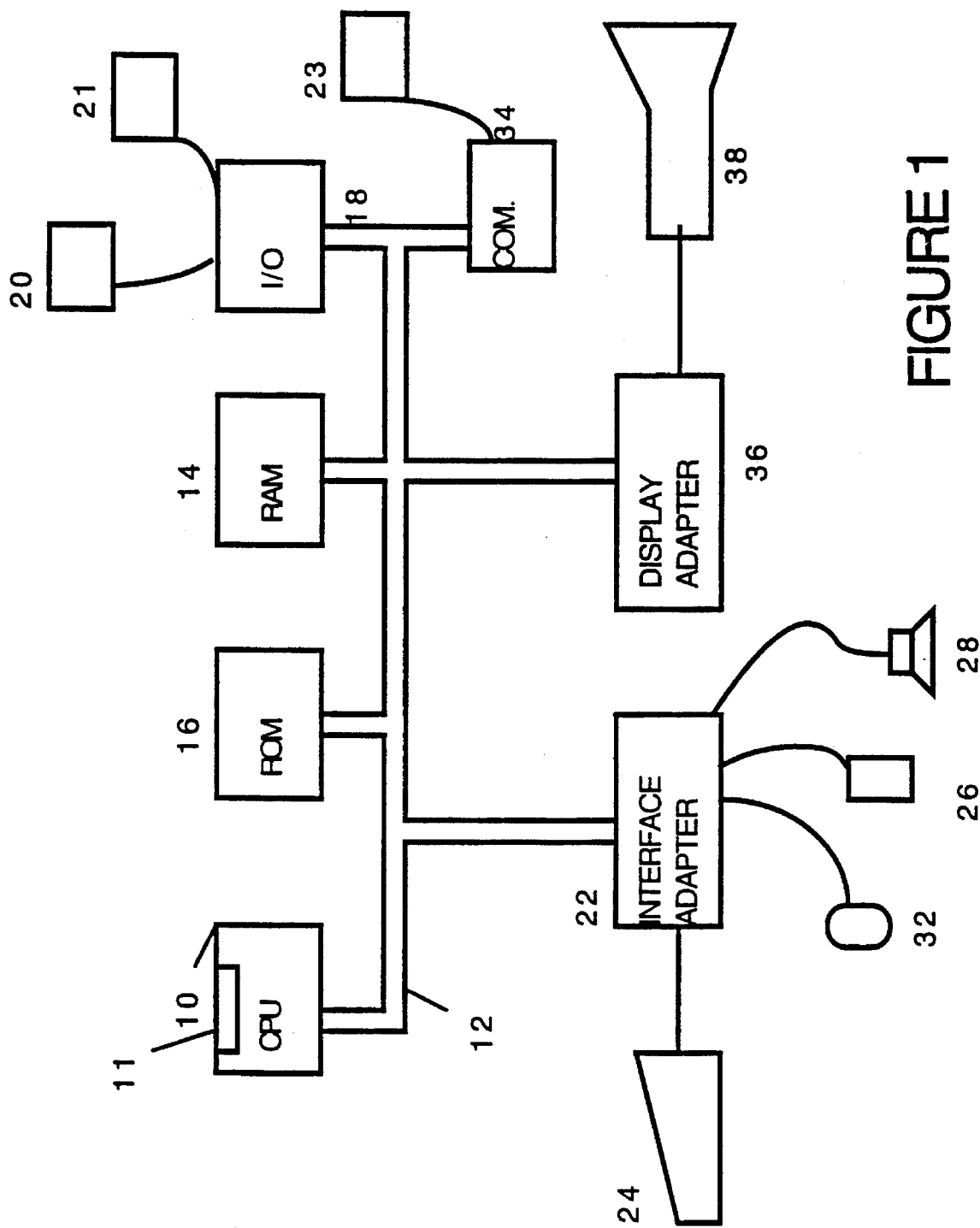
FIG. 1 is a block diagram of a personal computer system of the type used in the practice of the subject invention.
Figure 2:
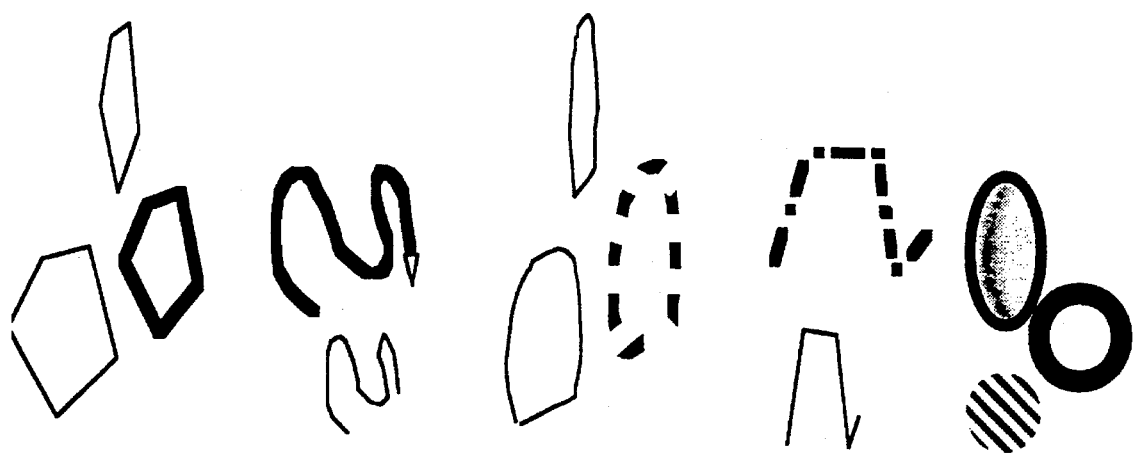
FIG. 2 is an illustration of various MGraphics and their geometries in accordance with a preferred embodiment.
Figure 2:
Figure 2:
Figure 2:
Figure 2:
Figure 2:

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or biotechnology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/ override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc. Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. It is important to an appreciation of the nature of the invention to understand the concept of a "framework" and the relationship of a framework to "objects" and "object oriented programming". "MacApp: An Application Framework" by Kurt A. Schmucker, published in Byte magazine in August 1986 is an early article describing a framework and the basic concepts embodied therein, which is hereby fully incorporated by reference. An important property of objects is their ability to encapsulate data and methods for which the object is responsible. That is, a generic command may be issued to an object without the need for any other object to know the internal details of how the object will carry out the command. By the same token, there is no need for global compatibility of commands, data, file names and the like and thus objects may be freely associated with one another. A framework is, in essence, a generic application comprising an association of classes of objects with which other objects may be associated, as necessary, to form a more specific application. The framework, as an association of classes of objects with functional interrelationships between classes of objects defined therein may provide any desired degree of general or specific functionality of additional objects which may be associated with the framework.

A framework may thus be regarded as a system which provides an implied network of responsibilities between objects, provides for inheritance between classes of objects (e.g. data and methods of superclasses at higher hierarchical levels of classes of objects), and provides for calling of libraries in response to events. A system formed as a framework may also be customized by the addition of objects which perform more specific functions and which may also override functions provided by the framework. Machine-specific and device-specific objects in various classes and subclasses of the framework allow the framework, itself, to be machine- and device-independent and of generalized applicability. Further, a particular framework is characterized by the interrelationships it establishes between objects and classes of objects in terms of division of responsibilities and inheritance and the functionality it thus achieves. A framework, itself, is also useful as a template for the development of specific applications in which customization and functional overrides may be provided as specific objects therein.

The present invention, a hit detection framework provides a mechanism to allow the application developer the flexibility to define the behavior for both primitive and custom geometric types. Hit detection, enables an application to directly manipulate graphic objects by defining a behavior for each geometric type. The developer can specify criteria as to what determines a hit, the extent of the search for a hit and the action to be performed in the event a hit occurs. The framework provides a default search protocol for the primitive geometric types. However, these default search protocols can be overridden and customized by the user.

Figure 3:
FIG. 3 shows the combination of primitive geometries to form simple and complex subclasses of MGraphic in accordance with a preferred embodiment.
Figure 3:
Figure 3:
Figure 4:
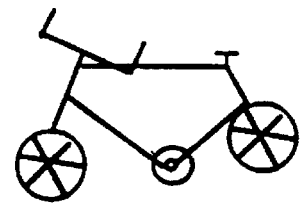
FIG. 4 illustrates an example of a graphic object, a bicycle, with many instances of the same MGraphic, a wheel in accordance with a preferred embodiment.

MGraphic is a utility class for applications. It holds geometry related data including geometric objects, attributes (in a bundle) and hierarchies. FIG. 3 shows various MGraphics and their corresponding geometries. These primitive geometric types can be combined by the user to create simple and complex subclasses of MGraphic, as shown in FIG. 4. The hit object framework allows customized hit criteria to be specified for any MGraphic subclass. Criteria can be defined for each primitive and self-defined geometric class. The MGraphic subclass then calls the appropriate method for the geometric types which they contain.

TGrafSearch & TGrafSearch3D are the principal objects containing the definitions of the criteria for hit detection and the action to be taken in the event a hit occurs. This information is used by the MGraphic::Find method to conduct the hit detection. When an application wants to perform hit detection on a group of MGraphics, the application creates a subclass of TGrafSearch, an object which defines (1) what constitutes a "hit" for each primitive geometric type; (2) the extent of the search, i.e. find one that satisfies or all that satisfy the criteria; and (3) the action to be performed if a successful hit occurs. The action to be performed if a successful hit occurs is application specific, but could include deleting, selecting or copying the selected object.

The first factor of TGrafSearch, hit criteria, is defined by the Find methods. The Find methods take the primitive geometry transformation matrix and the bundle of attributes as parameters and the methods can be defined as required by the application. Some examples of Find methods include testing a point against the bounding box of the geometry or determining whether a geometry is completely enclosed by a polygon and whether its bundle has a particular color.

The second type of information included in TGrafSearch defines the extent of the search for geometric objects which meet the hit criteria. An application may want to find all graphic objects which satisfy the search criteria or may want to find only the first occurrence which satisfies the criteria. For example, an application may wish to find all circles located within a rectangle or to find only the first line which intersects a circle.

The third element of TGrafSearch hit object framework is the definition of the desired action to be performed when the search criteria is satisfied. Examples of such desired actions include the collection of MGraphics which satisfy the search criteria for processing, performance of an application specific action, or generation of a value which summarizes the results of the search.

As an example of how hit objects are used, the code below shows TMySearch performing an application defined action on the first MGraphic which satisfies the criteria of intersection with a circle defined about the cursor.

```
/ / TMySearch is a subclass of TGrafSearch
TMySearch searcher( GetMousePosition( ), kHitRadius );
for (myGraphic = graphicList->First( );
    (myGraphic && myGraphic->Find( searcher ) !=
TGrafSeach!:kDoneSearching);
        myGraphic = graphicList->Next( ))
```

TGrafSearch defines many routines of the form virtual EFindResult Find(const TGSomething& geometry, const GrafMatrix&, . . . matrix, const TGrafBundle& b) for each type of primitive geometry. These methods define the criteria the TGrafSearch uses to determine if a hit has occurred. They return a result, EFindResult, which has one of two values, kDoneSearching, which indicates that the search can be stopped or kContinueSearching, which indicates that the search must continue. Two other routines, PushGraphic and PopGraphic are defined in TGrafSearch and both routines are used to regulate the behavior of the MGraphic as a whole. PushGraphic is a method which is used both to start the search within a specific MGraphic and to implement hierarchical MGraphics (to be discussed infra). PopGraphic returns the search status for the entire MGraphic. For example, if the application should search all MGraphics in the database, then PopGraphic is set to always return kContinueSearching.

A further example demonstrates the use of the second factor defined by TGrafSearch regarding the extent of the search to be performed. The code that follows is an example of both the routines used within MGraphics and those used to regulate the behavior of the MGraphic as a whole. The first TGrafSearch subclass, TIntersectsGrafSearch, finds first the item which intersect a rectangle, TGRect, while the second subclass, TContainsGrafSearch, finds all of the items which are completely contained within a rectangle, TGRect. The pseudo code for TIntersectsGrafSearch is as follows:

```
class TIntersectsGrafSearch : public TGrafSearch
{
    TIntersectsGrafSearch( const TGRect& bounds
    {
        fBoundsRect = bounds;
        initialize list of intersecting MGraphics to empty
    }
    EFindResult Find( const TGRect& const
TGrafMatrix&, const TGrafBundle& )
    {
    / / As soon as an intersection is found, return "done",
because the rest of the
    / / MGraphic need not be searched.
        if (fBoundsRect.Intersects( r ))
        {
            if fGraphic != NIL, add fGraphic to list of
intersecting objects
            fGraphic = NIL; / / So it isn't added twice
            return kDoneSearching;
        }
        else
            return kContineSearching;
    }
    / / Other geometric primitives are defined similarly . . .
    void PushGraphic( MGraphic * graphic)
    {
        fGraphic = graphic;
    }
    EFindResult PopGraphico
    {
        / / Pop Graphic stack & Return
kContineSearching so the client will search all MGraphics
        return kContineSearching;
    }
}
```

The pseudo code for TContainsGrafSearch is as follows:

```
class TContainsGrafSearch : public TGrafSearch
```

-continued

```
{
    TContainsGrafSearch ( const TGRect& bounds )
    {
        fBoundsRect = bounds;
        initialize list of contained MGraphics to empty
    }
    EFindResult Find( const TGRect& r, const
TGrafBundle& )
    {
        if (! fGraphic) return kDoneSearching; //
Graphic is not contained
        // Stop the search if a geometry outside
fBoundsRect is found, since
        // to qualify everything must be contained within
it.
        if (fBoundsRect.Contains( r ))
            return kContineSearching;
        else
        {
            fGraphic = NIL // Flag graphic as not
contained
            return kDoneSearching;
        }
    }
    // Other geometric primitives are defined similarly . . .
    void PushGraphic( MGraphic * graphic)
    {
        fGraphic = graphic;
    }
    EFindResult PopGraphic( )
    {
        if fGraphic != NIL, add fGraphic to list of
contained objects
        fGraphic = NIL; // So it isn't added twice
        // Return kContineSearching so the client will
search all MGraphics
            return kContineSearching;
    }
}
```

Figure 5:
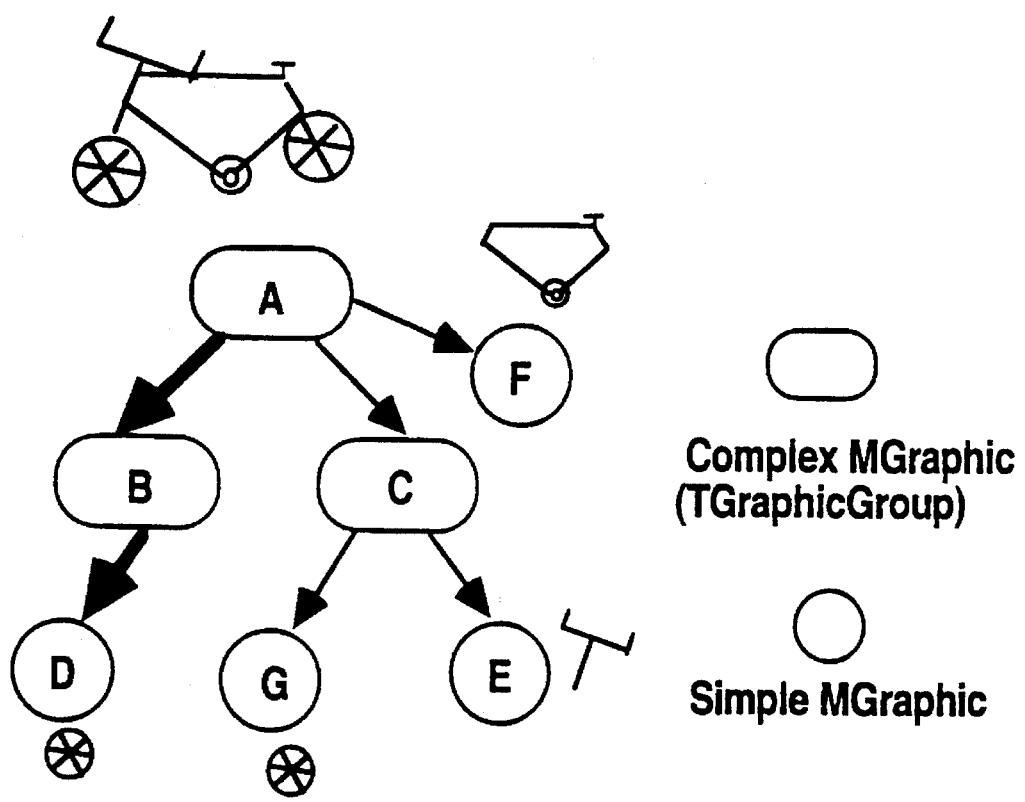
FIG. 5 illustrates the use of a path to record the correct instance for a hierarchical object in accordance with a preferred embodiment.
Figure 6:
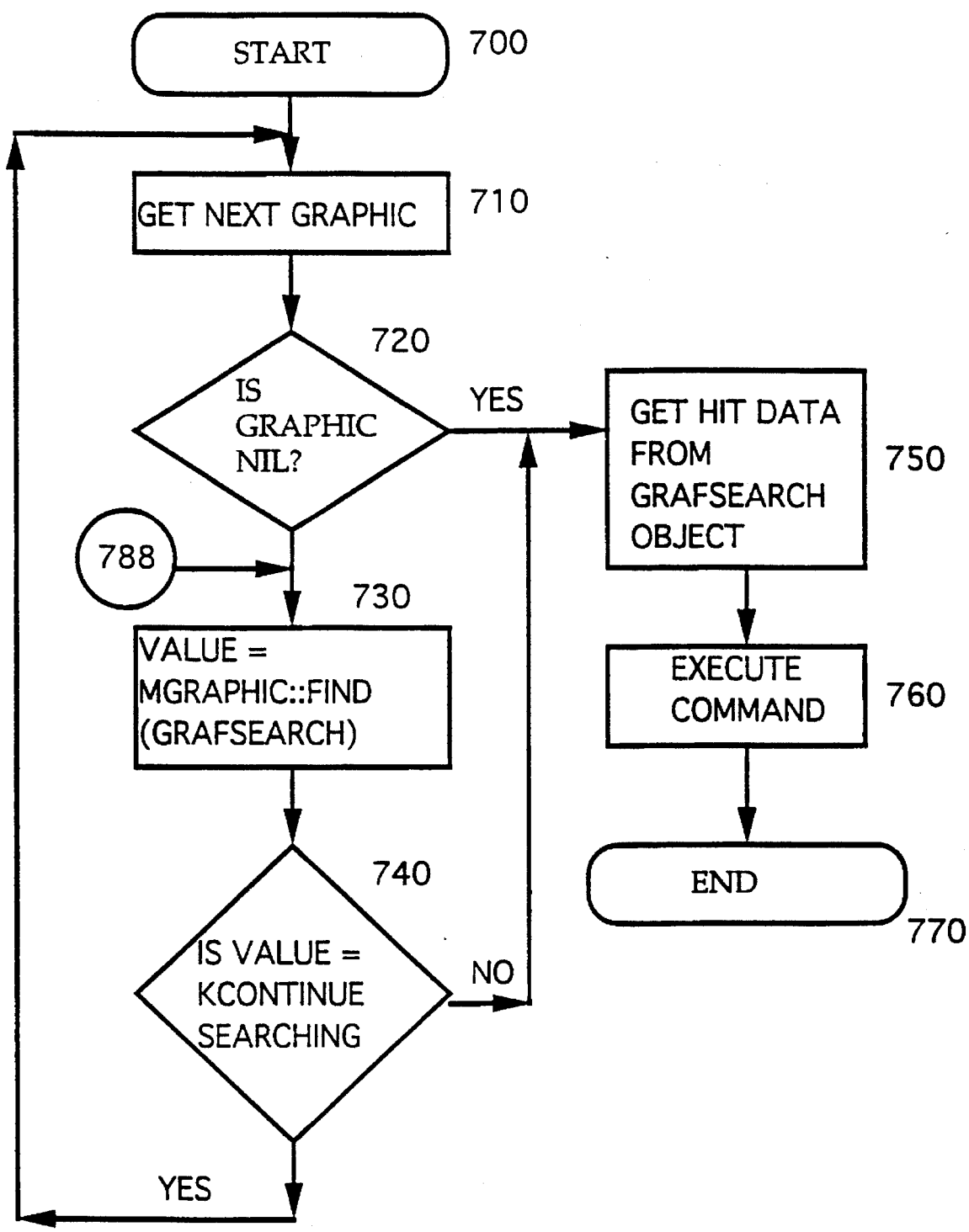
FIG. 6 is a flowchart illustrating the detailed logic of a hit (picking) operation in accordance with a preferred embodiment.

The framework also provides mechanisms to overcome the problems associated with hit testing of hierarchical data, the use of an MGraphic in multiple instances in an object. FIG. 5 shows a bicycle, with multiple instances of the wheel MGraphic. This type of data presents a problem because the return of only a pointer to a wheel will not uniquely identify the particular wheel on which the user has actuated (i.e. "clicked") the pointer. Therefore, it is necessary to distinguish between multiple instances of the same MGraphic. The framework accomplishes this by recording the path to the particular instance of the MGraphic which is desired. FIG. 6 illustrates how a path is used to identify the selected wheel on the bicycle. For example, to hit the rear wheel (object D), the path would be A, B, D.

The framework implements the hit testing of hierarchical MGraphics using the PushGraphic and PopGraphic methods of the TGrafSearch class. These methods take as parameters the MGraphic pointer, the bundle and the matrix for the particular group. If a hit occurs, PushGraphic can record the accumulated path which is a collection of transforms and pointers to groups.

The following pseudo code illustrates a find routine for a TGroup, a group of MGraphics.

```
TGraphicGroup::Find( const TGrafSearch& h )
{
    h.PushGraphic( *this, fMatrix, GetBundle( ));
    for (each child node &&
        (child->Find( TGrafSearch ) ==
TGrafSearch::kContinueSearching )
        h.PopGraphic( );
}
```

In addition to the subclasses of TGrafSearch which define the hit criteria, the extent of the search and the action to be taken for a hit, TGrafSearch can have subclasses which store information regarding the geometrically important features of the hit object. The information can be used by the application in a variety of ways, for example in defining "snap to" behavior.

Figure 7:
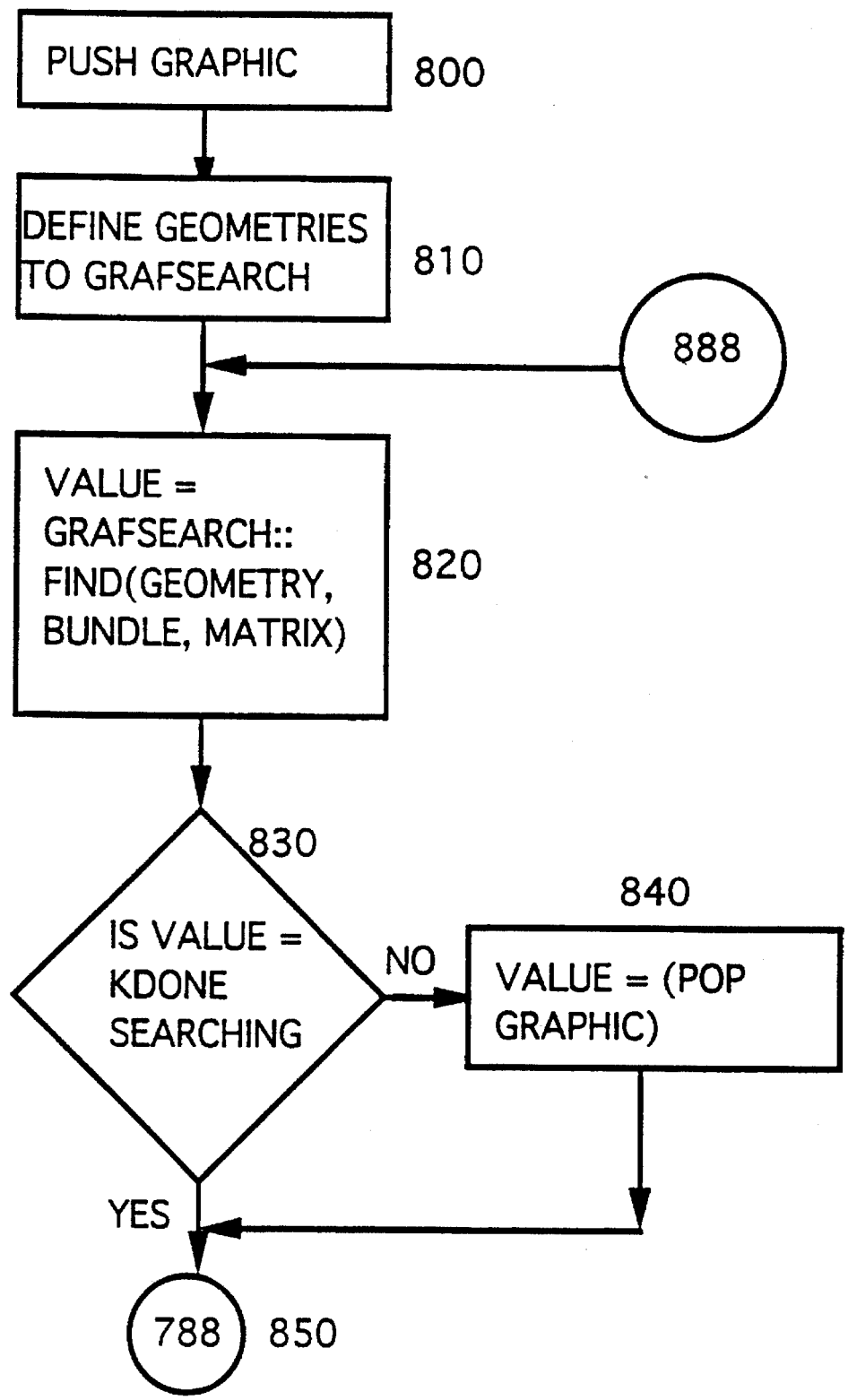
FIG. 7 is a flowchart illustrating the detailed logic for a graphic find operation in accordance with a preferred embodiment.

FIG. 7 is a flowchart illustrating the detailed logic of a hit (picking) operation in accordance with a preferred embodiment. Processing commences at terminal 700 and immediately passes to function block 710 to obtain the next graphic. Then, a test is performed at decision block 720 to determine if the graphic is nil. If so, then hit data is obtained from the grafsearch object as shown in function block 750, the command associated with the graphic hit/pick is executed as shown in function block 760, and processing is completed at terminal 770. If the graphic tests negative at decision block 720, then at function block 730, a function call to the graphic search routine is invoked as shown in function block 730 and detailed in FIG. 8. Value is set as a result of the function call and a test is performed at decision block 740 to determine if searching should continue based on value. If searching should not continue, then processing passes to function block 750 and hit data is obtained from the grafsearch object, then, the command associated with the graphic hit/pick is executed as shown in function block 760, and processing is completed at terminal 770.

Figure 8:
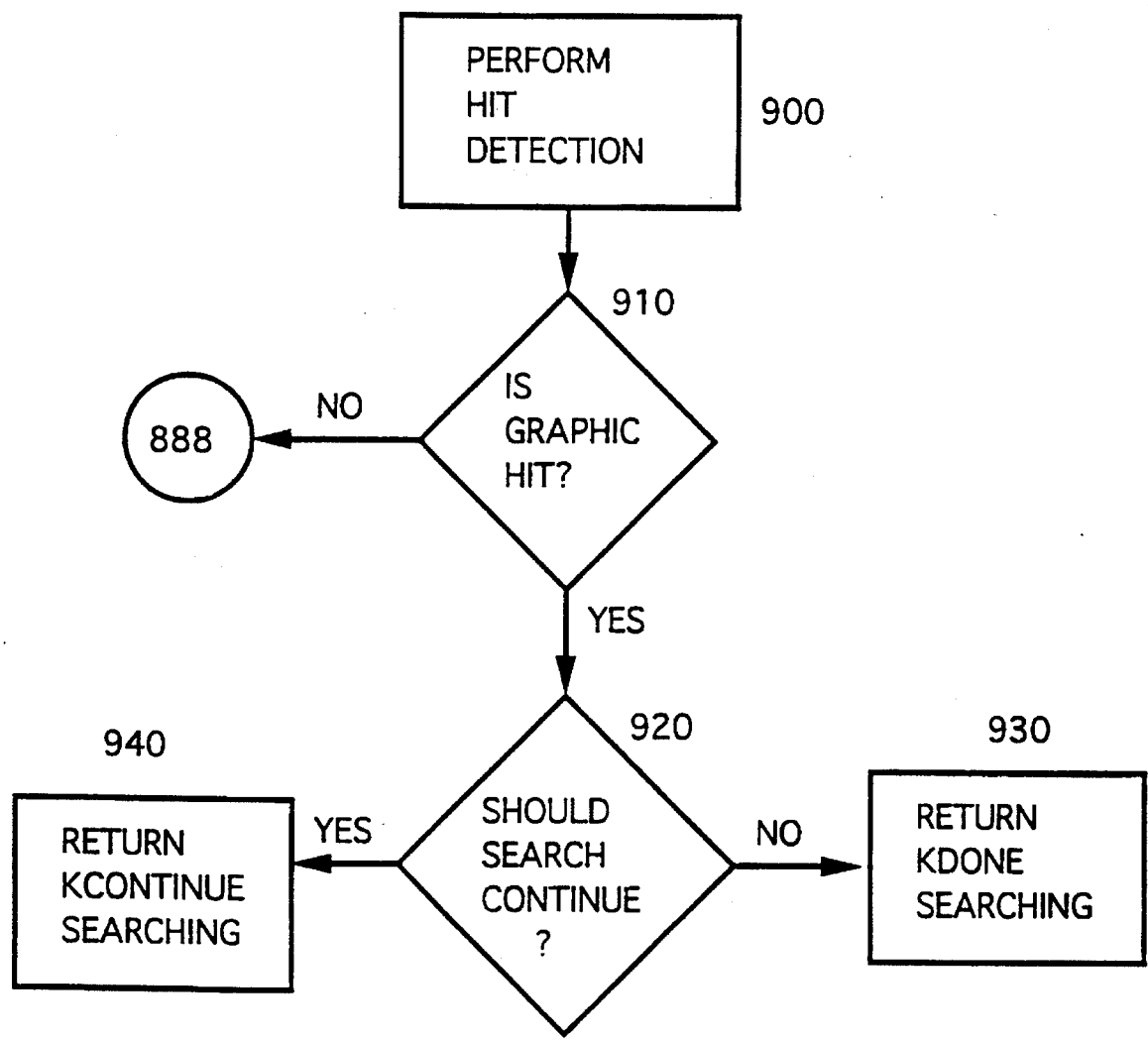
FIG. 8 is a flowchart illustrating the detailed logic for a graphic search operation in accordance with a preferred embodiment.

FIG. 8 is a flowchart illustrating the detailed logic for a graphic find operation in accordance with a preferred embodiment. Processing commences at function block 800, where the graphic is pushed onto a stack. Then, at function block 810, geometries of the search are defined to grafsearch, a function call to locate the graphic is made at function block 820, and detailed in FIG. 9; and a test is performed at decision block 830 to determine if the value returned from the function call indicates that the graphic was located. If so, then processing is resumed by passing control via label 850 to FIG. 7, label 788. If not, then value is set equal to the value of the graphic on the stack, and control is passed via label 850 to FIG. 7, label 788.

Figure 9:
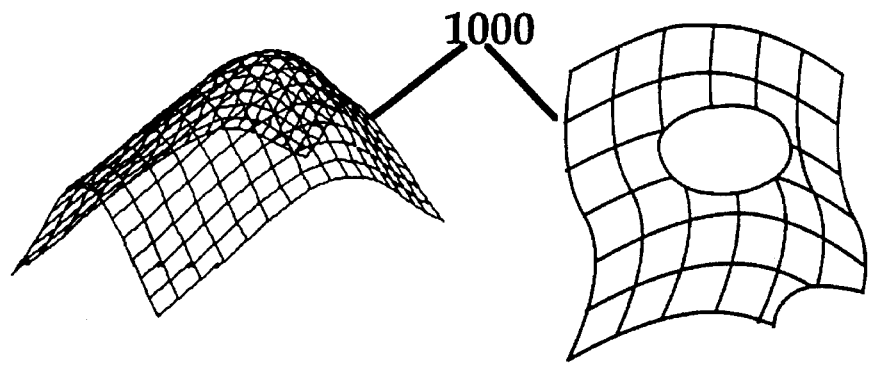
FIGS. 9 and 10 illustrate various three dimensional (3D) objects in accordance with a preferred embodiment.
Figure 10:
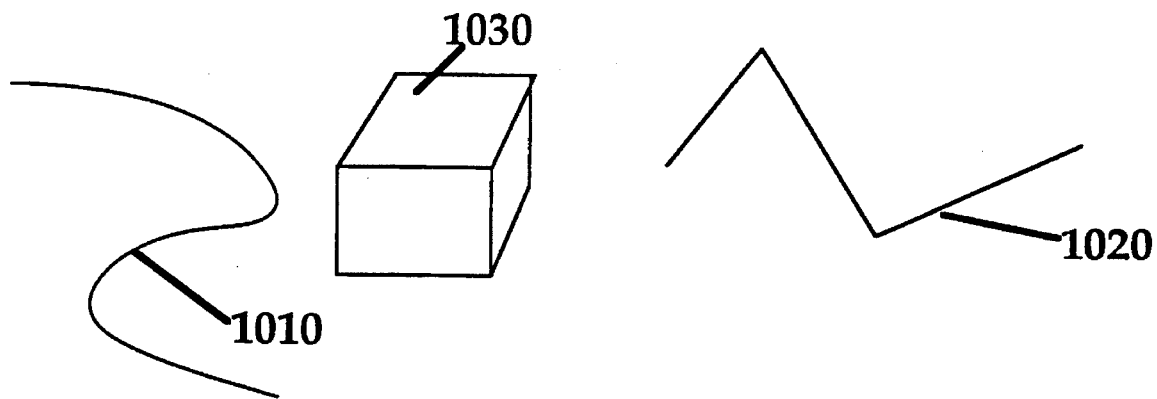
Figure 10:
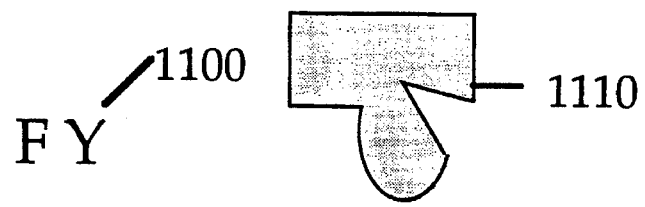
Figure 11:
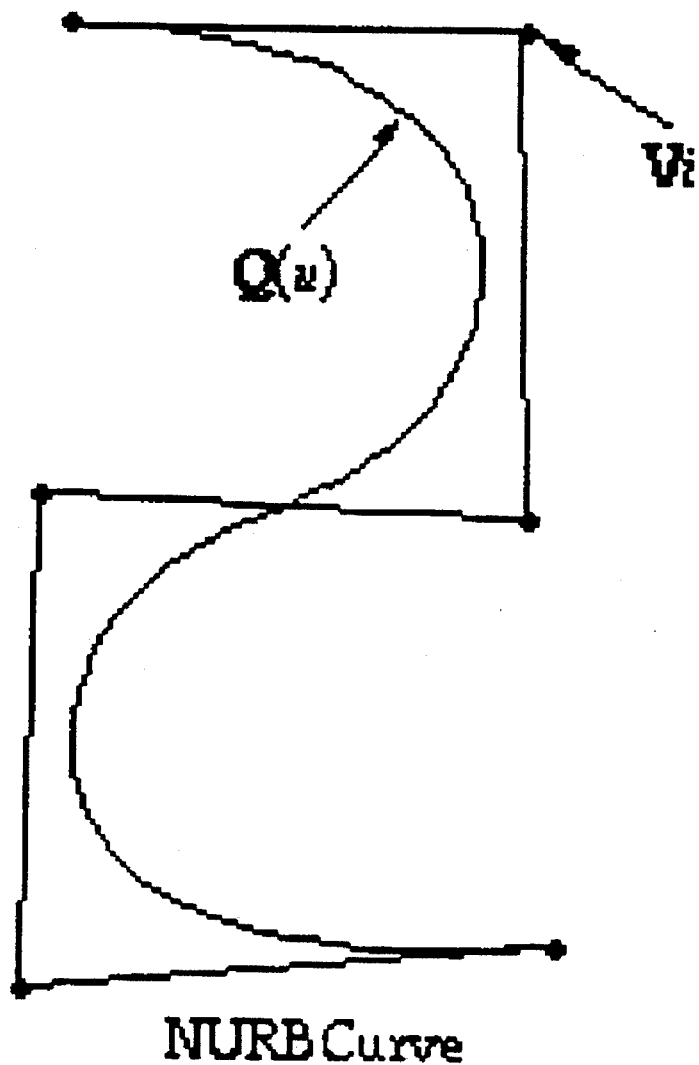
FIG. 11 is an illustration of a NURB curve in accordance with a preferred embodiment.

FIG. 9 is a flowchart illustrating the detailed logic for a graphic search operation in accordance with a preferred embodiment. Processing commences at function block 900 where hit detection is performed. Then, at decision block 910, a test is performed to determine if a graphic was hit. If not, then control is returned to label 888 of FIG. 8. If a graphic was hit, then another test is performed at decision block 920 to determine if the search should continue. If so, then value is set equal to a value indicative of continue searching. If not, then value is set equal to a value indicative of done searching. In either case, control is returned from the function to the calling routine. FIG. 10 and 11 illustrate various two dimensional (2D) objects in accordance with a preferred embodiment. 3D surfaces are shown at label 1000, 3D curves are presented at 1010, a 3D line and polyline are presented at 1020 and a 3D box is presented at 1030. In FIG. 11, an example of a 2D font 1100 and a graphic area 1110 are illustrated.

Parametric curves are frequently used in computer graphic and computer-aided design. They are often used to represent common shapes such as character glyphs, smoothed shapes created from freehand sketches, primitive geometric shapes, and generative curves for three-dimensional objects. A particular form of parametric curve, the *Non-Uniform, Rational B-Spline* (NURB) is often used in computer graphics systems and applications.

The formula for a point Q(u) on a NURB curve is:

$$Q(u) = \frac{\sum_{i=0}^{m} B_{i,k}(u)V_i}{\sum_{i=0}^{m} B_{i,k}(u)w_i}$$

where:
 u, is the parameter of the curve,
 $B_{i,k}(u)$ are the B-spline basis functions
 k is the order of the polynomial defining the curve,
 $V_i$ is an array of control points, of size i=0..m,
 $w_i$ is the "rational" component of the control points (the weights). They should be >0.
A curve also has a knot vector, $\{ui\}_{i=0}^{m+k}$ used by the basis functions for controlling its continuity. The basis functions are for general B-splines, defined by:

$$B_{i,1}(u) = \begin{cases} 1 & u_i \leq u < u_{i+1} \\ 0 & \text{otherwise} \end{cases}$$

$$B_{i,r}(u) = \frac{u - u_i}{u_{i+r-1} - u_i} B_{i,r-1}(u) + \frac{u_{i+r} - u}{u_{i+r} - u_{i+1}} B_{i+1,r-1}(u) \bigg|_{r=2,3,k}$$

Figure 12:
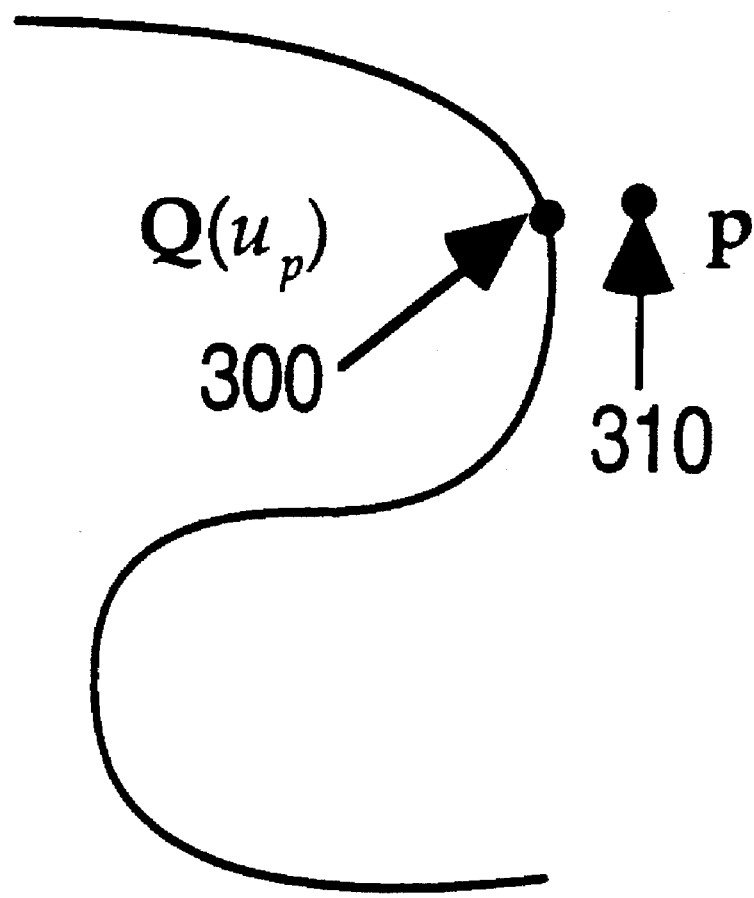
FIG. 12 is an illustration of a method for interactively manipulating curves in accordance with a preferred embodiment.

As the value of u goes from $u_0$ to $u_{m+k}$, the function Q(u) traces out the shape of the curve. An example of a NURB curve in accordance with a preferred embodiment is illustrated in FIG. 11. A preferred embodiment provides a method and system for interactively manipulating curves as shown in FIG. 12. The method utilizes a method in accordance with a preferred embodiment enabling a rapid way to find $u_p$ such that $Q(u_p)$ 300 is the nearest point on the curve to point p 310. This method enables interactive manipulation of curves of arbitrary complexity.

Figure 13:
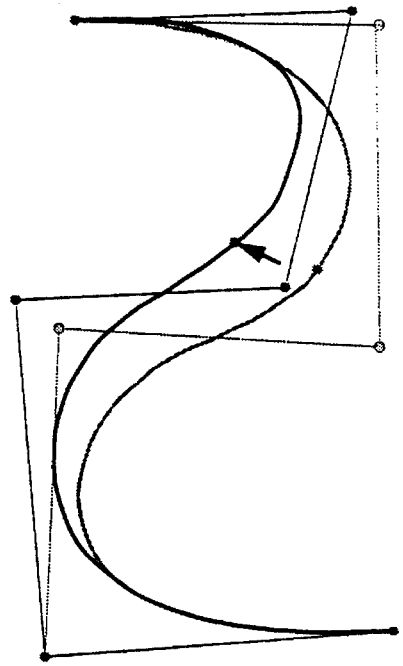
FIG. 13 illustrates fine control at arbitrary points on a curve as a curve is interactively manipulated.
Figure 14:
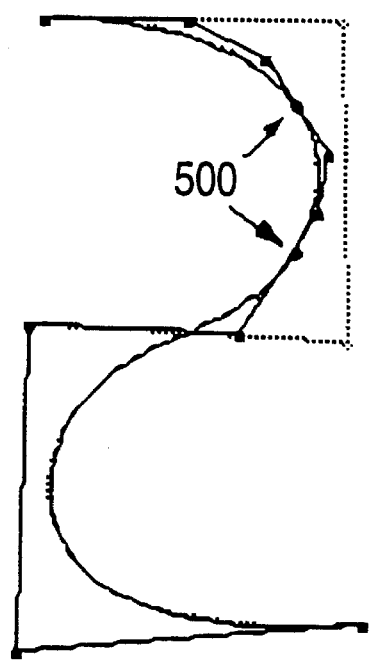
FIG. 14 illustrates another method for dynamic curve manipulation in accordance with a preferred embodiment.

For many graphics applications, it is desirable to modify the curve interactively. The simplest way to do this is by dragging the control points $v_i$. However, this is often counter-intuitive for users who are unaware of the underlying representation (e.g., because the curve was created by smoothing a freehand sketch), and does not provide fine control at arbitrary points on the curve as illustrated in FIG. 13. A better method of manipulating parametric curves has been described by Bartels and Beatty (Bartels, R. H. and Beatty, J. C., "A Technique for the Direct Manipulation of Spline Curves", Proc. of Graphics Interface 1989) and Fowler (Fowler, B. and Bartels, R. H., "Constraint Based Curve Manipulation", IEEE Computer Graphics and Applications, 1992). These methods allow a user to pick an arbitrary point on the curve, and move that point on the curve to another location, smoothly deforming the curve to accomodate the new location. Thus, the curve appears to move in an intuitive fluid motion, and a user need not be aware of the underlying representation. Direct manipulation of curves works by moving the control points in amounts proportionante to their influence on the selected point on the curve, in the direction indicated by the new location for that point on the curve, such as the points of FIG. 13. Another use of the method is for selecting points on the curve for use in subsequent geometric computations. For example, if a user wishes to select or extract a portion of the curve, the easist way to indicate the selection is by selecting two points on or near the start (a) 500 and end (b) 500 of the selected section in FIG. 14. Once the parametric values of these points is known, knot insertion methods (such as Boehm's alrgorithm (Farin, G. "Curves and Surfaces for Computer Aided Geometric Design", Academic Press, 1989), or the Oslo Algorithm (Bartels, R. H., Beatty,. J. C. Barsky, B. A., "An Introduction to Splines For Use in Computer Graphics and Geometric Modelling," Morgan Kaufman, 1988) may be applied to increase the multiplicty of knot values at $u_a$ and $u_b$. to the order k of the curve. This creates $C_0$ discontinuities at these two points, 500 allowing the subsection to be extracted at the discontinuities.

Figure 15:
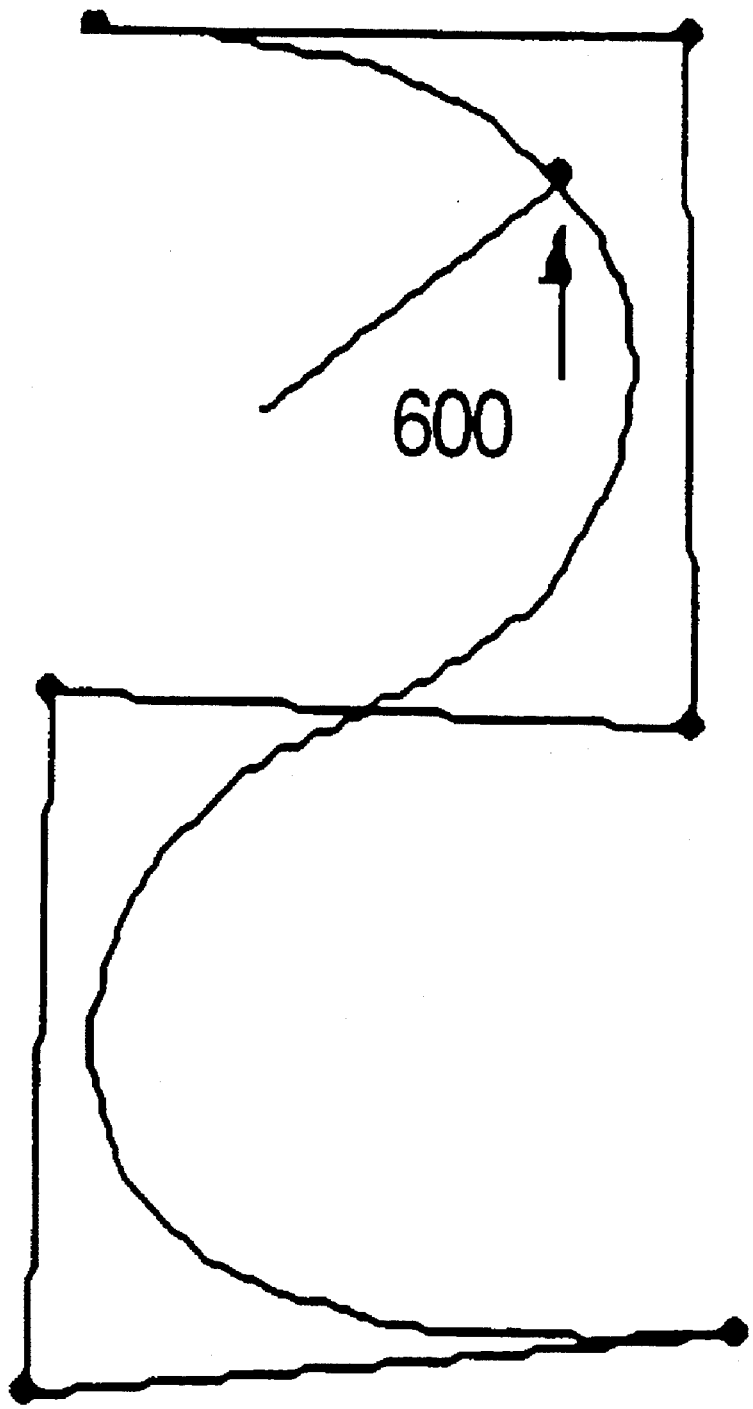
FIG. 15 illustrates a method for placing a line on a curve in accordance with a preferred embodiment.

A third example is simply placing objects on a selected spot on the curve, such as the perpindicular bisector 600 illustrated in FIG. 15. By finding the parametric value of a point selected on or near the curve, the curve can be evaluated at that parametric value producing an exact point on the curve, used to position the object. A preferred embodiment of the invention also provides support for three dimensional figures that are readily extensible to N dimensional space.

Method for finding parametric values

In all of the above examples, a key to rapidly performing these types of interactions interactively is finding the value of the curve's parameter at the point selected. Once this is known, the interactions on the curve are of a local nature and thus required processing time is relatively constant. The typical method of finding $u_p$ involves a root-finding method as disclosed in Press, Teukolsky, Vetterling, & Flannery, "Numerical Recipes," (Cambridge University Press, 1988) This method attempts to find the value of u that minimizes the equation $\|p - Q(u)\|$. There is no closed form way to minimize this expression, so some approximation method must be used. Traditional numerical methods, such as Brent's method require substantial computation. Over the length of a complicated curve, this makes selection prohibitively slow on common personal computers.

Another method is to break the curve into line segments. With the line segments, it is possible to iterate over them and find the closest line segment to the point p. Doing this for the length of a complex curve becomes prohibitively expensive, because a complex curve may generate a huge number of line segments over its entire length.

Figure 16:
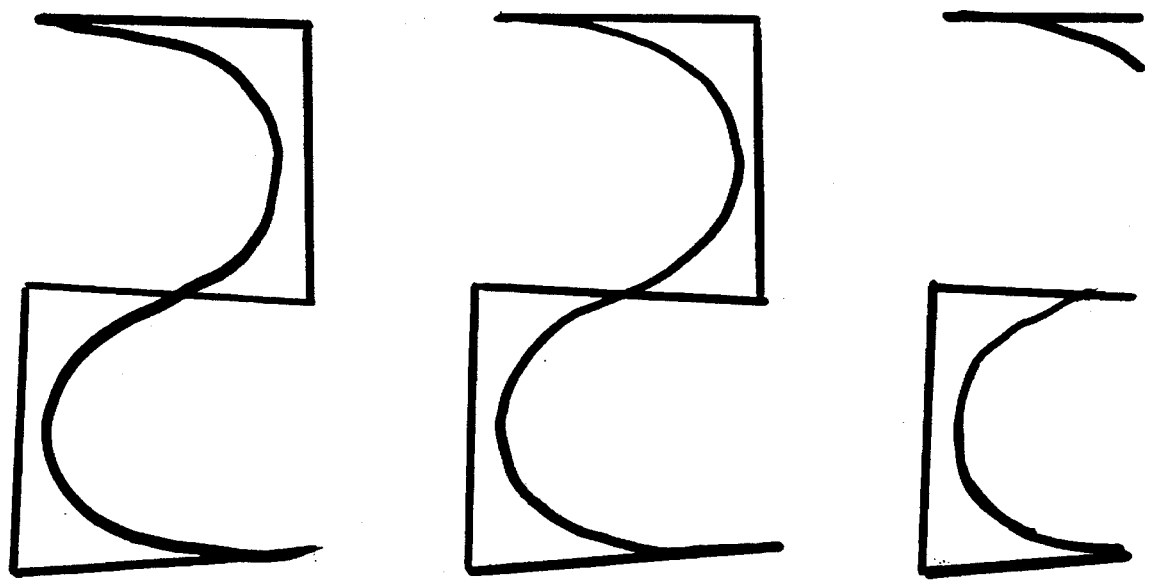
FIG. 16 illustrates a plurality of convex hulls of various spans of a curve in accordance with a preferred embodiment.
Figure 17:
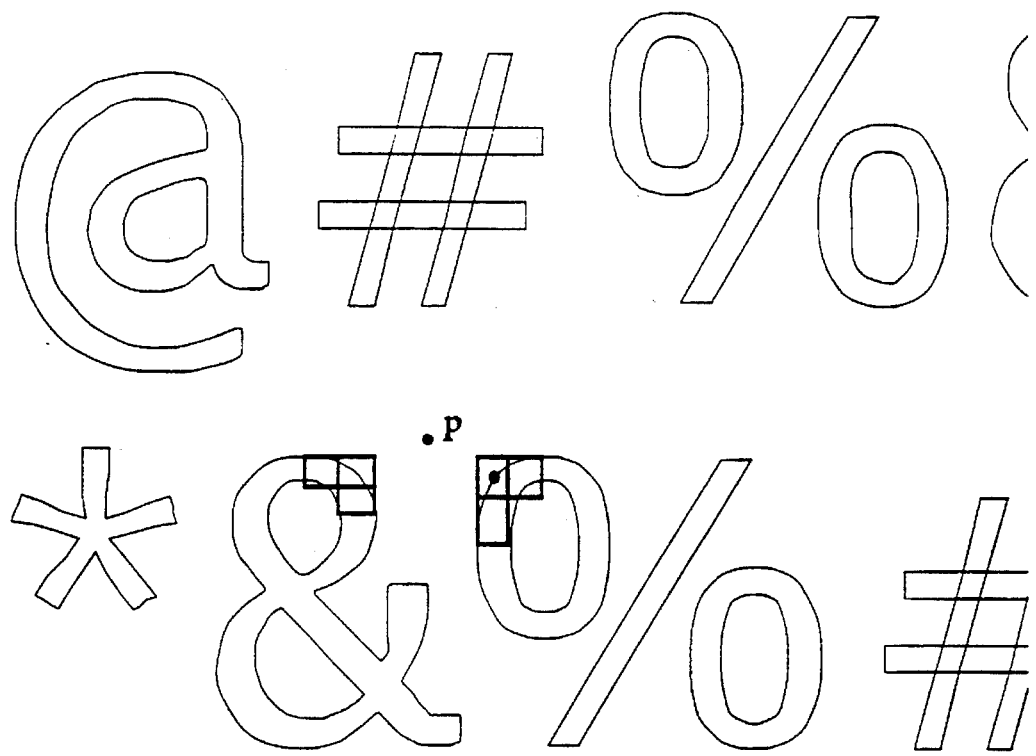
FIG. 17 illustrates a complex curve in accordance with a preferred embodiment.

A method in accordance with a preferred embodiment utilizes the underlying control points specifying the curve shape, and the convex hull property of spline curves as illustrated in FIG. 16. The convex hull property holds that for a given parametric span of a curve, the curve will lie inside the convex hull of the control points defining the shape of that span. Although not as tight a fit, a bounding rectangle is a useful approximation to a span's convex hull, because it can be rapidly tested for inclusion as illustrated in FIG. 17. To reduce the number of spans that must be analyzed for nearness to a curve, a set of bounding boxes is computed for each span of the curve. This computation requires the review of each k set of control points, where k is the order of the curve.

Figure 18:
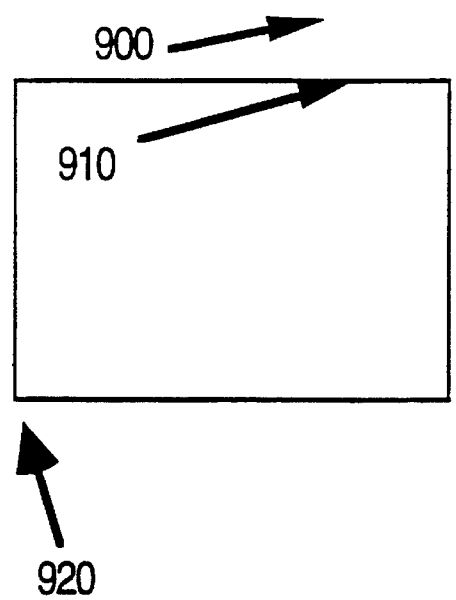
FIG. 18 illustrates a bounding box in accordance with a preferred embodiment.

FIG. 18 illustrates a bounding box in accordance with a preferred embodiment. Each bounding box records $d_{near}$, the distance to the nearest point on the edge of the box 910 to the point p 900, and $d_{far}$, the furthest point on the edge of the box from p 920. If p is inside the box, then the nearest distance is zero. After these two values are computed for each of the span bounding boxes, the spans with $d_{near}$ values exceeding the smallest $d_{far}$ value may be removed from consideration. This initial step typically removes much of the curve from consideration.

Figure 19:
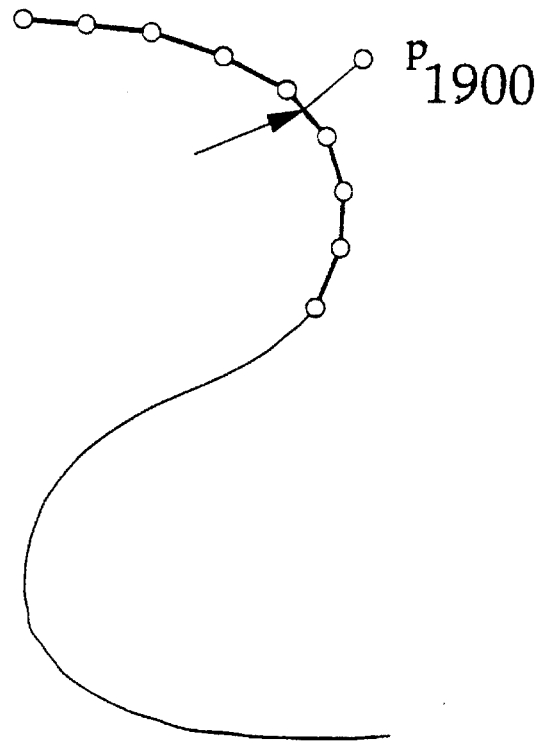
FIG. 19 illustrates a nearest initial segment within a nearest span in accordance with a preferred embodiment.

For the remaining spans, the curve is evaluated at 2k equal parametric steps, and these steps are converted to line segments (2k is selected since a span may have at most k influctions, or directional changes). The distance from each of the line segments generated from the span to p is recorded, and if it is closer than any other identified span, then the span is flagged as the nearest span. If the $d_{near}$ (bounding box) distance for subsequent spans analyzed is greater than the value generated from evaluation, then that span is ignored. The span is bounded in parameter space, $u_i$ and $u_{i+1}$. The distance from the point p 1900 to the span is computed by finding the point on the line segment that forms the perpendicular bisector to p. Once this point is known, the ratio of the distance between this point on the line segment and the beginning of the line segment to the length of the line segment, gives a parametric distance along the line segment, t. An initial estimate of $u_p$ is computed from $u_p = u_i + (u_{i+1} - u_i)t$. FIG. 19 illustrates a nearest initial segment within the nearest span in accordance with a preferred embodiment. The processing illustrated in FIG. 19 will resolve a single span as the "nearest", according to the initial evaluation criteria. To increase the precision of the computation of $u_p$, the parametric interval defined by the closest line segment may be further processed. A similar number of steps is made between the parametric intervals defined by the endpoints of the segment identified as the closest in the above process. The process of finding $u_p$ is repeated on this new set of line segments. This increases the accuracy of the approximation by several orders of magnitude, yet does not require significant additional computation.

Figure 20:
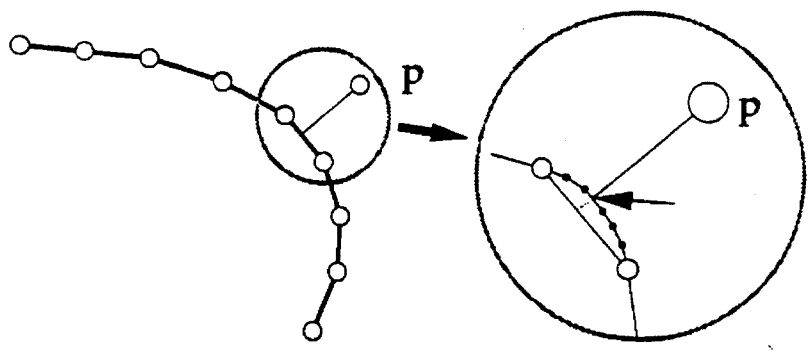
FIG. 20 illustrates a method for stepping within a segment to produce a precise nearest point in accordance with a preferred embodiment.
Figure 21:
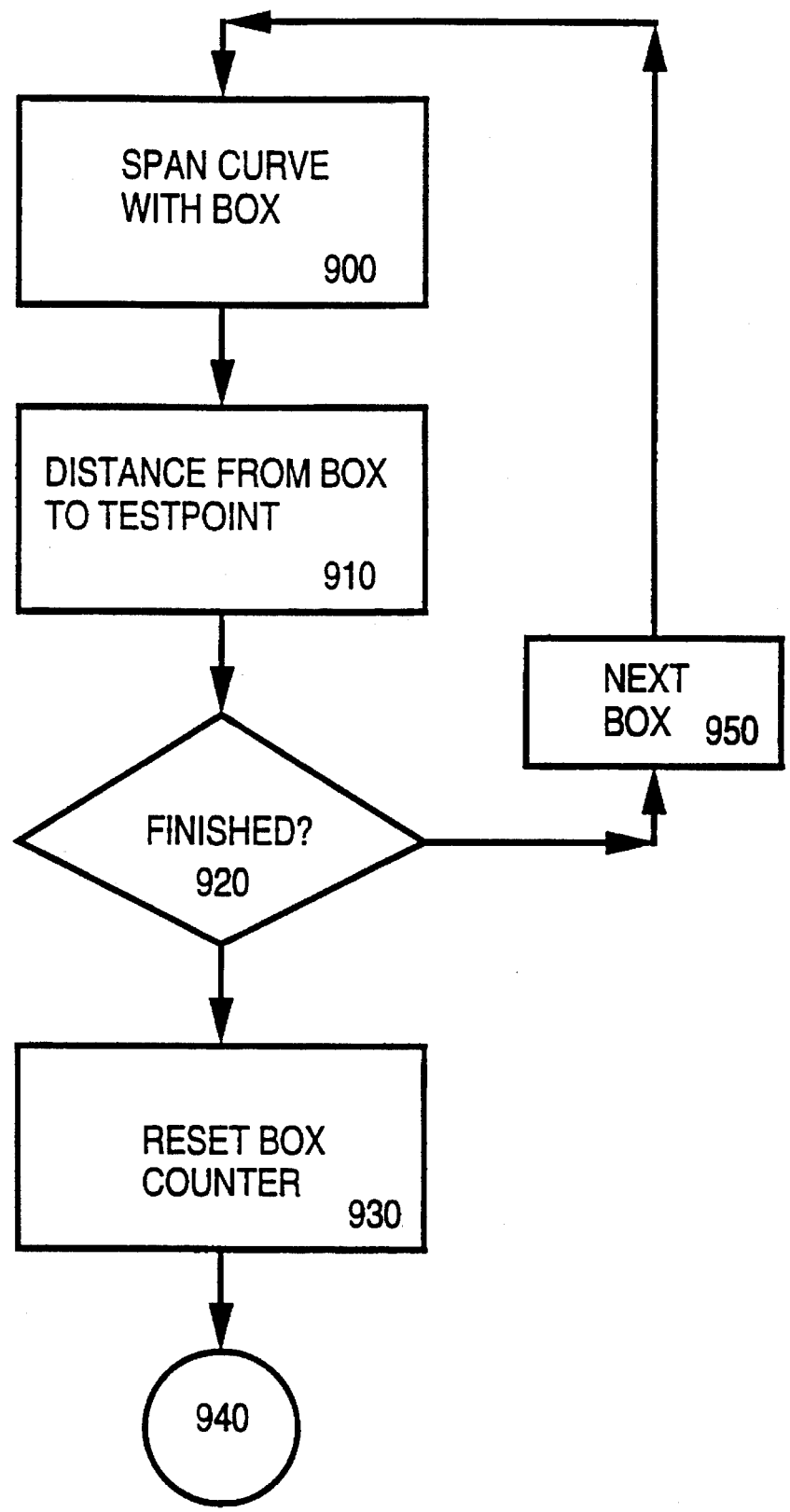
FIGS. 21–25 illustrate detailed flowcharts setting forth the logic of a method in accordance with a preferred embodiment.
Figure 22:
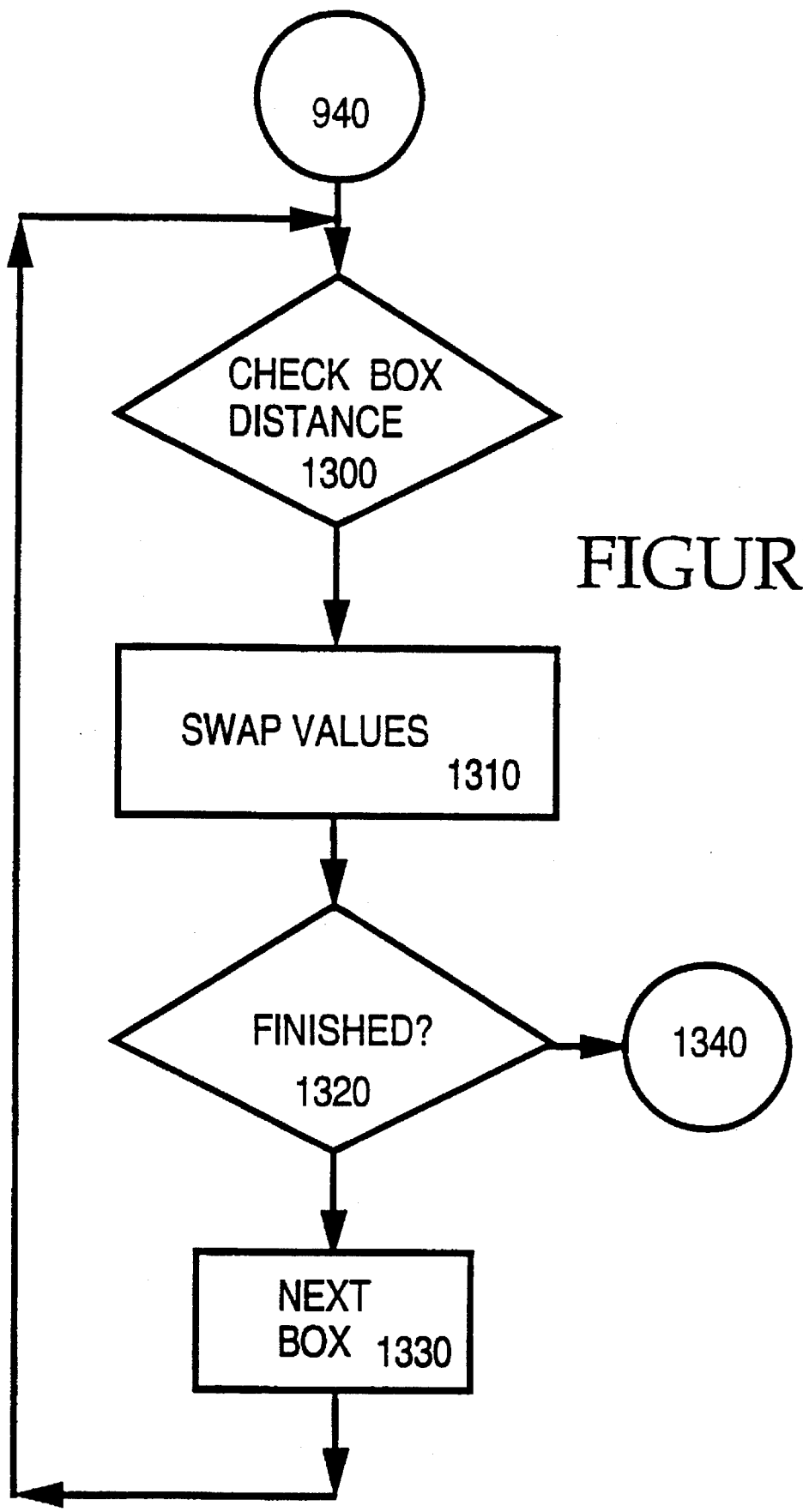
Figure 23:
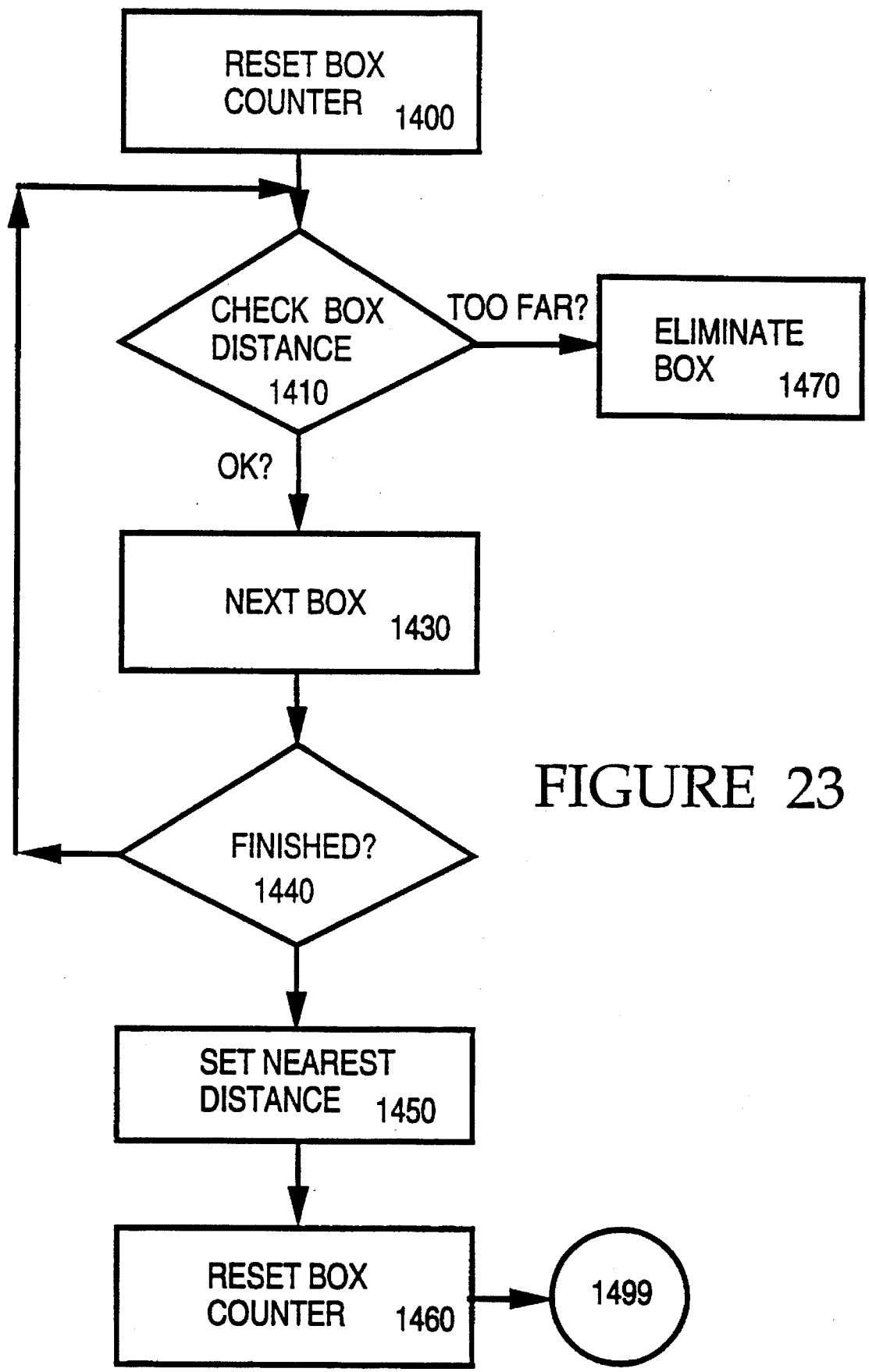
Figure 24:
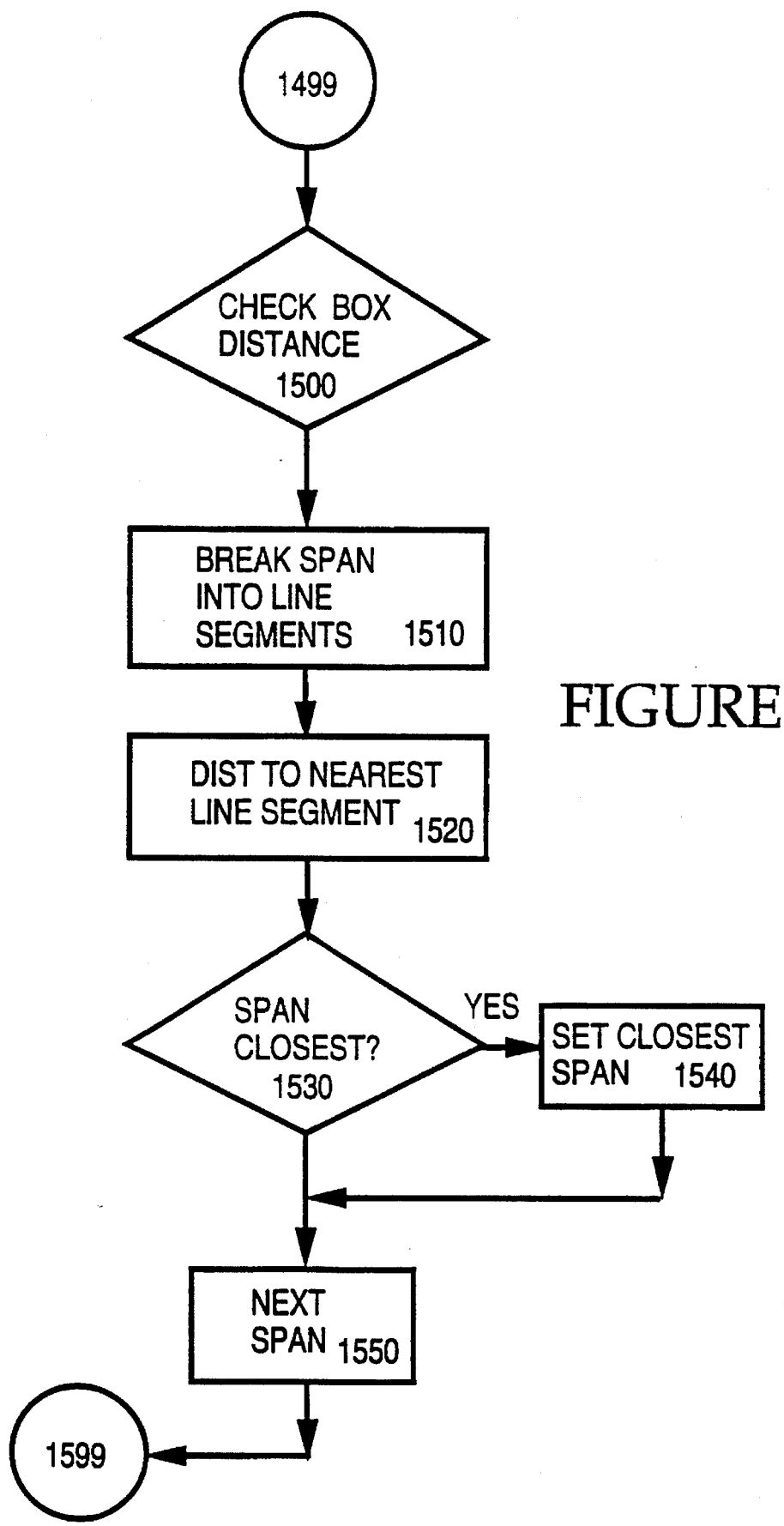
Figure 25:
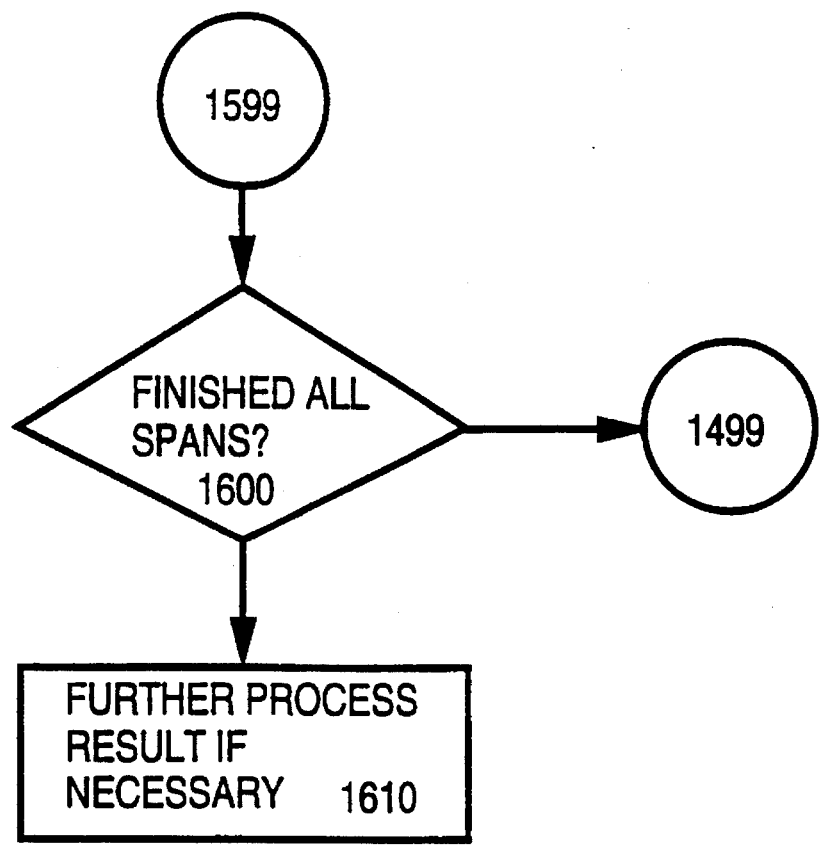

This process may be repeated to further increase accuracy, although it is generally not necessary for typical interactive applications. FIG. 20 illustrates an example of stepping within a segment to produce a precise nearest point in accordance with a preferred embodiment.

While the invention has been described in terms of a single preferred embodiment, those skilled in the art will recognize that the invention can be practiced with modification within the spirit and scope of the appended claims.

Having thus described our invention, what we claim as new, and desire to secure by Letters Patent is:

1. A computer implemented system for determining if a cursor has entered into an area on a display proximal to a particular graphic object displayed on said display utilizing a search protocol for a plurality of geometric types including a plurality of points on a curve displayed on said display, made up of a plurality of spans, comprising a plurality of control points specifying a plurality of bounding boxes, comprising:

(a) a processor;

(b) a memory attached to and under the control of said processor;

(c) a display attached to and under the control of said processor with a cursor displayed on said display;

(d) means for defining a search protocol for a geometric type in said memory under the control of said processor;

(e) means for detecting a point on a curve displayed on said display, comprising:

(f) means for determining a plurality of spans, comprised of control points specifying said curve's shape utilizing;

(g) means for calculating a bounding box for each of said plurality of spans utilizing said control points;

(h) means for detecting a selection signal and storing in said memory a location of said cursor on said display;

(i) means for examining each bounding box and recording in said memory a nearest distance from said bounding box to said location of said cursor on said display and a farthest distance from said bounding box to said location of said cursor on said display;

(j) means for filtering nearest distance values which are larger than said farthest distance value and discarding each associated span to the filtered nearest distance values which are larger than said farthest distance value;

(k) means for examining each remaining span, computing line segments approximating said curve within said remaining span; and (l) means for selecting said curve which is nearest to said cursor.

2. The system as recited in claim 1, including means for computing a set of line segments approximating said curve by examining the selected curve which is nearest to said cursor utilizing line segments of finer granularity.

3. The system as recited in claim 1, including means for processing a hierarchy of graphical objects displayed on a display and selecting a position on a curve in said hierarchy of graphical objects displayed on said display.

4. The system as recited in claim 1, including means for processing a set of parameters including a starting and ending parameter by selecting a section of a curve utilizing said starting and said ending parameters of said parameters.

5. The system as recited in claim 1, including means for aligning objects based on a selected point on said display.

6. The system as recited in claim 1, including means for distorting a curve utilizing means for selecting a point on the curve and moving said point to a new location.

7. The system as recited in claim 1, including means for selecting a point on a three dimensional object.

8. The system as recited in claim 1, including means for selecting a point on an N dimensional object.

9. A computer implemented method for determining if a cursor displayed on a display has entered into an area on said display attached to a processor with an attached memory, said area proximal to a graphic object displayed on said display, said method utilizing a search protocol for a plurality of geometric types including a plurality of points on a curve displayed on said display, made up of a plurality of spans, comprising a plurality of control points specifying a plurality of bounding boxes, comprising the steps of:

(a) defining a search protocol for a geometric type in said memory under the control of said processor;

(b) detecting a point on a curve displayed on said display;

(c) determining a plurality of spans, comprised of control points specifying said curve's shape utilizing;

(d) calculating a bounding box for each of said plurality of spans utilizing said control points;

(e) detecting a selection signal and storing in said memory a location of said cursor on said display;

(f) examining each bounding box and recording in said memory a nearest distance from said bounding box to said location of said cursor on said display and a farthest distance from said bounding box to said location of said cursor on said display;

(g) filtering nearest distance values which are larger than said farthest distance value and discarding each associated span to the filtered nearest distance values which are larger than said farthest distance value;

(h) examining each remaining span, computing line segments approximating said curve within said remaining span; and (i) selecting said curve which is nearest to said cursor.

10. The method as recited in claim 9, including the step of computing a set of line segments approximating said curve by examining the selected curve which is nearest to said cursor utilizing line segments of finer granularity.

11. The method as recited in claim 9, including the step of processing a hierarchy of graphical objects displayed on a display and selecting a position on a curve in said hierarchy of graphical objects displayed on said display.

12. The method as recited in claim 9, including the step of processing a set of parameters including a starting and ending parameter by selecting a section of a curve utilizing said starting and said ending parameters of said parameters.

13. The method as recited in claim 9, including the step of aligning objects based on a selected point on said display.

14. The method as recited in claim 9, including the step of distorting a curve utilizing a selected point on the curve and moving said point to a new location.

15. The method as recited in claim 9, including the step of selecting a point on a three dimensional object.

16. The method as recited in claim 9, including the step of selecting a point on an N dimensional object.

\* \* \* \* \*